United States Patent [19]

Armand

[11] Patent Number: 4,818,644

[45] Date of Patent: Apr. 4, 1989

[54] IONICALLY CONDUCTIVE MATERIAL

[75] Inventor: Michel Armand, St. Martin d'Uriage, France

[73] Assignees: Centre National de la Recherche Scientifique; Societe Nationale Elf Aquitaine, both of Paris, France; Hydro-Quebec, Montreal, Canada

[21] Appl. No.: 115,050

[22] Filed: Oct. 30, 1987

[30] Foreign Application Priority Data

Oct. 30, 1986 [FR] France ................. 86 15115

[51] Int. Cl.$^4$ ............................................. H01M 6/18
[52] U.S. Cl. .................................. 429/192; 252/62.2
[58] Field of Search ............... 429/192, 194; 252/62.2

[56] References Cited

U.S. PATENT DOCUMENTS 4,303,748 12/1981 Armand et al. ................. 429/192
4,505,997 3/1985 Armand et al. ................. 429/192
4,542,081 9/1985 Armand et al. ................. 429/192

4,589,197 5/1986 North ........................ 429/192

*Primary Examiner*—Donald L. Walton
*Attorney, Agent, or Firm*—Oblon, Fisher, Spivak, McClelland & Maier

[57] ABSTRACT

Ionically conductive material composed of a salt represented by one of the following formulas:

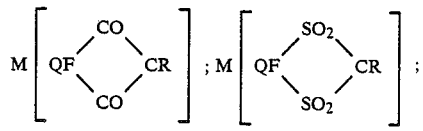

M [RF—CO—CR—CO—R'F];
M [RF—CO—CR—SO$_2$—R'F];
M [RF—SO$_2$—CR—SO$_2$—R'F]

in a liquid or solid solvent.

Application to electrochemistry.

6 Claims, No Drawings

IONICALLY CONDUCTIVE MATERIAL

This invention concerns a new ionically conductive material usable especially as a liquid or solid electrolyte for the purpose of making electrochemical generators.

This new material is composed of a salt in solution in a liquid or solid solvent, with this salt being represented by one of the following formulas:

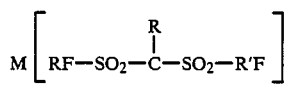 (I)

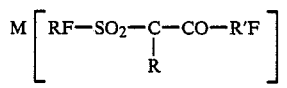 (II)

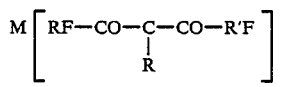 (III)

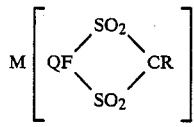 (IV)

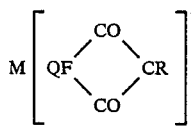 (V)

in which

M is an alkali metal, alkaline earth metal, transition metal, or rare earth,

RF and R'F, which are the same or different, each represents a perhalogenated, preferably perfluorinated group, having from 1 to 12 carbon atoms, R is hydrogen or an alkyl group having from 1 to 30 carbon atoms, QF is a divalent perfluorinated radical having from 2 to 6 carbon atoms.

This salt can be placed in solution in a macromolecular material of the type of those described in European Pat. No. 013199, and in particular, in a homopolymer or copolymer of ethylene oxide, or in a material of the polyphosphazene type.

According to another characteristic of the invention, this salt can be placed in solution in an aprotic polar liquid solvent chosen from the group consisting of:

linear ethers such as diethyl ether, dimethoxyethane, or cyclic ethers such as tetrahydrofuran, dioxane, or dimethyltetrahydrofuran, esters such as methyl or ethyl formate, propylene or ethylene carbonate, or the butyrolactones, nitriles, acetonitriles, benzonitriles, nitrated derivatives such as nitromethane or nitrobenzene, amides such as dimethylformamide, diethylformamide, or N-methylpyrrolidone, sulfones such as dimethyl sulfone, tetramethylene sulfone, and other sulfolanes.

Actually, these salts have a surprisingly high solubility in these various types of solvents.

To make the solid electrochemical generators in which the solvent is a macromolecular material of the type of those described in European Pat. No. 013199, the ratio between the number of atoms of the metal M and the number of oxygens or heteroatoms of the polymer, is selected from a range of values between 1 and 40.

Preferably, this ratio is about 30.

According to another characteristic of the invention, the ionically conductive material includes a salt pursuant to one of the formulas (I) to (IV), but it can also include a second salt or several other salts, provided that all of these salts have the same cation.

Of these salts, one of the salts described in European Pat. No. 013199 will preferably be chosen, but it is also possible to choose a salt described in French Pat. No. 2,527,602 or in French Pat. No. 2,527,610.

However, again preferably, a perhalogenated salt of the type described and claimed in U.S. Pat. No. 4,505,997 and known by the name of TFSI will be chosen. TFSI designates trifluorosulfonyl imide. Its salt thus is lithium bis(trifluoromethylsulfonyl)imide having the formula $(CF_3SO_2)_2NLi$.

As an example of liquid solvent chosen from the sulfones, it is beneficial to choose a sulfonated derivative of the type represented by the formula (V):

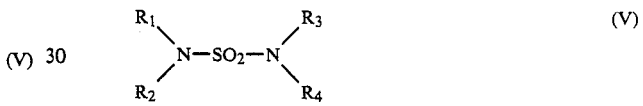 (V)

in which $R_1$, $R_2$, $R_3$, and $R_4$ are identical or different, and each represents an alkyl or oxaalkyl group having from 1 to 10 carbon atoms.

Ethyl groups are preferably chosen for $R_1$, $R_2$, $R_3$, and $R_4$.

The ionically conductive material pursuant to the invention will be used beneficially as a solid electrolyte for making either primary or secondary electrochemical batteries, but it will also be used to make composite electrodes such as those described in European Pat. No. 013199; this electrode can then be associated with an electrolyte comprising the same macromolecular material or a different material.

By way of illustrating the invention, two examples of generators made with the new material will be described below without thereby limiting the invention.

EXAMPLE 1

A first generator was made by combining by pressure the three following thin-film elements:
a composite positive electrode,
a solid electrolyte,
a negative electrode based on lithium.

The solid electrolyte consisted of an ionically conductive material composed of a solution of a salt called TFSM (i.e., trifluorosulfonyl methane, the salt thus being bis(trifluoromethylsulfonyl)methyl lithium having the formula $(CF_3SO_2)_2CHLi$) and represented by Formula (I) in which:

RF=R'F=$CF_3$,

M=Li

R=H in a copolymer of ethylene oxide and methyl glycidyl ether, with the solution being made at the rate of 30 atoms of oxygen originating from the copolymer for 1 atom of lithium.

The ionic conductivity of this material is equal to approximately $10^{-5}$ ohm$^{-1}$ cm$^{-1}$ at room temperature.

The composite positive electrode was made by incorporating $TiS_2$ powder and carbon black in the said ionically conductive material by way of active substance, at the rate of 20% by weight of ionically conductive material relative to the total weight of the electrode, and making a thin film of the product thus obtained.

The composite positive electrode had a thickness of 65 microns.

The generator formed by combining the three aforesaid elements comprised a battery that could be recharged for more than 200 cycles at room temperature.

EXAMPLE 2

A second generator similar to the generator of Example 1 was made, but the composition and thickness of the composite positive electrode were changed.

The positive electrode was obtained by incorporating a powder of $V_6O_{13}$ and carbon black in the ionically conductive material of Example 1 to obtain 50% by weight of ionically conductive material relative to the total weight of the electrode, and making a thin film of the product thus obtained.

The composite positive electrode had a thickness of 15 microns.

The generator formed by combining the three elements, the positive electrode, the solid electrolyte, and the negative electrode, after 200 charge/discharge cycles at room temperature, still retained more than 60% of the energy available after the tenth charge/discharge cycle.

Of course, the invention is not limited to the forms of embodiment described. On the contrary, it encompasses all of the variations.

I claim:

1. Ionically conductive material composed of a salt in solution in a solvent, characterized by the fact that the salt is represented by one of the following formulas:

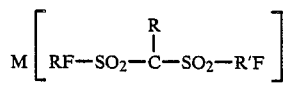  I

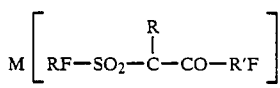  II

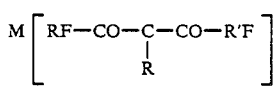  III

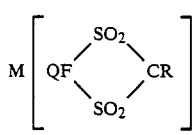  IV

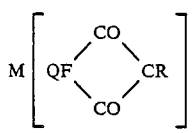  V in which:
  M is an alkali metal, alkaline earth metal, transition metal, or rare earth metal,
  RF and R'F, which are identical or different, each represents a perhalogenated, preferably perfluorinated group having from 1 to 12 carbon atoms,
  R is hydrogen or an alkyl group having from 1 to 30 carbon atoms,
  QF is a divalent perfluorinated group having from 2 to 6 carbon atoms.

2. Material pursuant to claim 1, characterized by the fact that the solvent is an aprotic liquid.

3. Material pursuant to claim 1, characterized by the fact that the solvent is a macromolecular material.

4. Material pursuant to claim 3, characterized by the fact that the macromolecular material is a homopolymer or copolymer of ethylene oxide.

5. Material pursuant to claim 3, characterized by the fact that the macromolecular material is a polyphosphazene.

6. Material pursuant to claim 2, characterized by the fact that the solvent is a sulfone represented by the formula:

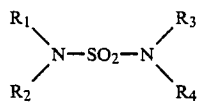

in which $R_1$, $R_2$, $R_3$, and $R_4$ are alkyl or oxaalkyl groups having from 1 to 10 carbon atoms.

* * * * *